United States Patent
Hall

[19]

[11] Patent Number: 6,131,399
[45] Date of Patent: Oct. 17, 2000

[54] REFRIGERATED VENDING MACHINE

[76] Inventor: Donald M. Hall, 63 N. Country Rd., Mount Sinai, N.Y. 11766

[21] Appl. No.: 09/205,185

[22] Filed: Dec. 4, 1998

Related U.S. Application Data

[60] Provisional application No. 60/067,309, Dec. 4, 1997.

[51] Int. Cl.[7] .................................................. G07F 11/00
[52] U.S. Cl. .................................. 62/127; 62/250; 221/2; 221/150 R; 705/28
[58] Field of Search ........................... 62/125, 126, 127, 62/129, 130, 131, 246, 249, 250; 221/1, 9, 150 R, 150 HC, 150 A, 2, 7, 8; 705/28

[56] References Cited

U.S. PATENT DOCUMENTS

| | | |
|---|---|---|
| 854,805 | 5/1907 | Crawford . |
| 1,859,270 | 5/1932 | McKee et al. . |
| 1,866,511 | 7/1932 | McKee et al. . |
| 3,884,386 | 5/1975 | Urcola ........................................... 221/7 |
| 4,523,439 | 6/1985 | Denisot ....................................... 62/251 |
| 4,597,506 | 7/1986 | Eglise et al. ................................... 221/6 |
| 5,086,693 | 2/1992 | Tippmann et al. ......................... 99/333 |
| 5,147,068 | 9/1992 | Wright ............................. 221/150 A X |
| 5,244,266 | 9/1993 | Maldanis .................................. 312/116 |
| 5,457,963 | 10/1995 | Cahill-O'Brien et al. ................... 62/78 |
| 5,520,941 | 5/1996 | Oosterling ................................ 426/232 |
| 5,660,304 | 8/1997 | Halsey et al. ................................ 221/1 |
| 5,930,771 | 7/1999 | Stapp ......................................... 705/28 |

*Primary Examiner*—Harry B. Tanner
*Attorney, Agent, or Firm*—Shlesinger, Arkwright & Garvey LLP

[57] ABSTRACT

Vending machine includes at least one food or perishable item compartment. A sensor is provided for detecting a condition in the food compartment and/or vending machine. The detector senses conditions such as temperature, motion, and the like. Food product bar code data, expiration date data, and product visual data may likewise be collected. Lock-out elements are provided for preventing access to the vended products when detected conditions warrant.

38 Claims, 2 Drawing Sheets

REFRIGERATED VENDING MACHINE

CROSS REFERENCE TO RELATED APPLICATIONS

This application claims the priority of Provisional Application No. 60/067,309, filed Dec. 4, 1997.

FIELD OF THE INVENTION

This invention relates to vending machines. More particularly, this invention relates to refrigerated vending machines. Most particularly, this invention relates to refrigerated vending machines having sensors for providing feedback to and for controlling the operation of various components of the vending machine.

BACKGROUND OF THE INVENTION

Refrigerated vending machines are known.

Examples of such vending machines include U.S. Pat. No. 5,520,941 to Oosterling; U.S. Pat. No. 5,086,693 to Tippmann et al.; U.S. Pat. No. 5,457,963 to Cahill-O'Brien et al.; U.S. Pat. No. 5,244,266 to Maldanis; U.S. Pat. No. 4,597,506 to Eglise et al.; U.S. Pat. No. 4,523,439 to Denisot; U.S. Pat. No. 3,884,386 to Urcola; U.S. Pat. No. 1,866,511 to McKee et al.; U.S. Pat. No. 1,859,270 to McKee et al.; and U.S. Pat. No. 854,805 to Crawford.

Despite such an abundance of vending machines, many of which are refrigerated, there is still a need for a vending machine which overcome the drawbacks of the prior art devices.

Such drawbacks include that none of the known conventional devices include a lock-out for preventing the sale of vended meat, or other perishable food, or other perishable non-food items which have been warmed up or which have experienced a warming up cycle.

In addition, none of the known devices include a remote calling device for automatically contacting an off-site operator or other operator who is at a distance from the machine.

Still further, none of the known conventional devices includes a remote alarm for alerting the operator to a situation in which the controlled environment inside the vending machine is experiencing an undesired warming up of (or an undesired cooling down of) such controlled environment.

OBJECTS AND SUMMARY OF THE INVENTION

Accordingly, it is an object of the invention to provide a device which overcomes the drawbacks of conventional devices.

Another object of the invention is to provide a device which vends pre-cooked and uncooked food products in a more consistent and regulated manner than possible with known devices.

A further object of the invention is to provide a device which can be used to dispense food products, such as meat and cheese, which are held in a controlled environment.

A further object of the invention is to provide a device for dispensing food which includes a temperature alarm.

Another object of the invention is to provide a device for dispensing food which includes a malfunction recorder.

A yet still further object of the invention is to provide a device which includes a lock-out for preventing dispensing of food items when certain conditions have been detected by one or more sensors.

Another object of the invention is to provide a device for dispensing food products which meets meat, poultry, seafood and/or cheese sanitary codes, for example, and which device can be "washed down" externally and/or internally.

Another object of the invention is to provide a device for dispensing food which can be set to operate in a narrow temperature range.

A further object of the invention is to provide a device for dispensing food which can be operated by cash and/or credit cards and/or charge cards and/or prepaid debit cards and/or chain store tokens.

Another object of the invention is to provide a vending machine which prevents dispensing or sale of perishable non-food items such as prescription or non-prescription medicines, batteries, and film, for example.

Yet another object of the invention is to provide a food vending machine which is capable of sending out a distress call to a central station/operator when certain conditions have been met; e.g., when a temperature malfunction has been detected and/or theft/burglary/vandalism on the device has occurred.

Another object of the invention is to provide a food vending device which is connectable to an in-store monitor, such as a motion or audio or visual sensor.

Yet another object of the invention is to provide a vending device which is suited for dispensing specialized products, such as three (3) eggs and/or pre-weighed, uncooked meat.

A further object of the invention is to provide a food vending device which includes a temperature malfunction recorder and/or a lock-out to prevent use of the machine if the food compartment is too warm/has been too warm (and/or too cold) for maintaining the food products in the desired predetermined range.

Another object of the invention is to provide a food vending device equipped with a date code sensitive system, which may have each individual compartment assigned a specific identification location, for example, for inventory control purposes, for purposes of controlling dispensing of food products based on expiration dates (which expiration dates may be encoded on bar codes for example), for allowing service persons on site or at a remote site to read vending and/or expiration data, for serving as a component of the lock out for preventing vending of food stuffs from that individual compartment, and/or for providing the consumer/vending machine user with information as to why the product is unavailable.

A further object of the invention is to provide a vending machine for accurately dispensing date-sensitive items, such as medicines.

Another object of the invention is to provide a vending machine having a plurality of vending compartments for dispensing a plurality of items, in which dispensing device may include a lazy susan type dispenser, a carrousel dispenser, and/or a dispenser mechanism of the type having a plurality of product-containing compartments attached together by a flexible connector in the form of a continuous elongated pathway, for example.

Yet another object of the invention is to provide a dispensing device which provides continuous inventory control, as well as providing for perpetual inventory control/live inventory, and which may provide a continuous expired/lost item report corresponding to the status of the inventory of products in the machine or a number of machines forming a group.

It will be understood that in the description of the invention relative terms such as "swarm" and "cold", "meat" and "cheese" are not intended to be limiting.

General terms such as bar code reader are intended to include all types of readers including optical readers for reading dates and object recognition devices which determine what an object is based on its physical appearance.

Remote calling devices include devices which telephone central controllers, emit radio signals, and the like.

Computers include all manner of computer chips, on site and off site computer hardware, data processing devices, and the like, whether or not physically contained in whole or in part within or adjacent to the vending machine.

These are merely example of items for which there are many substitutes which are readily apparent and are intended to come within the scope of the invention.

DETAILED DESCRIPTION OF THE INVENTION

Figure 1:
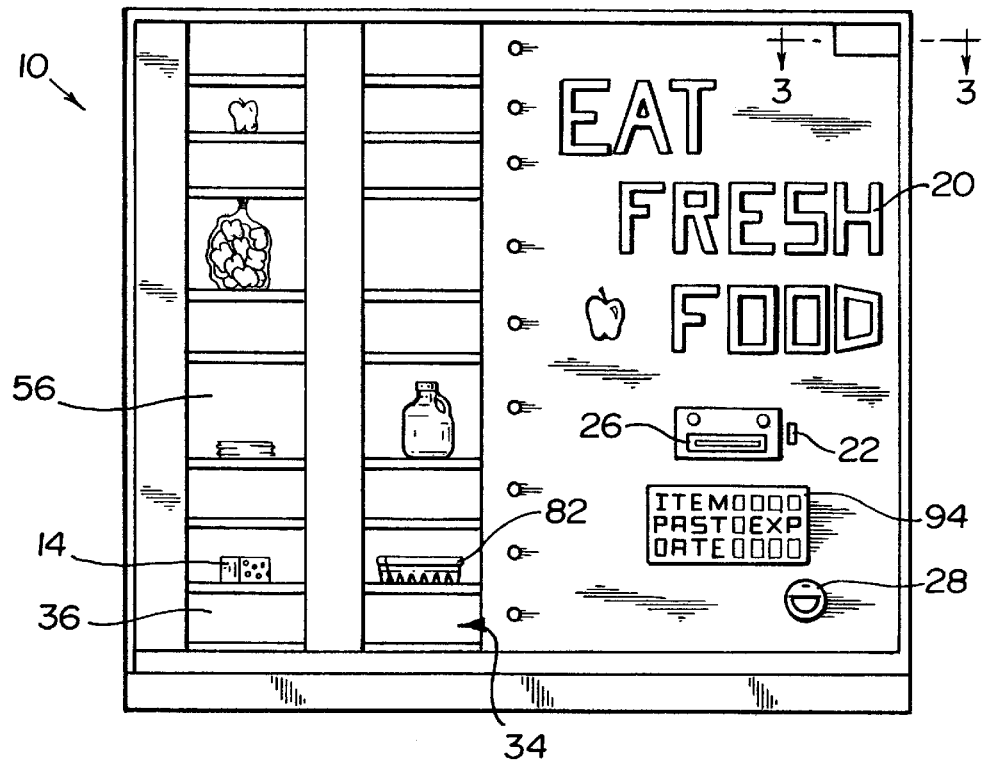
FIG. 1 is a front elevational view of a first preferred embodiment of a vending machine according to the invention.
Figure 2:
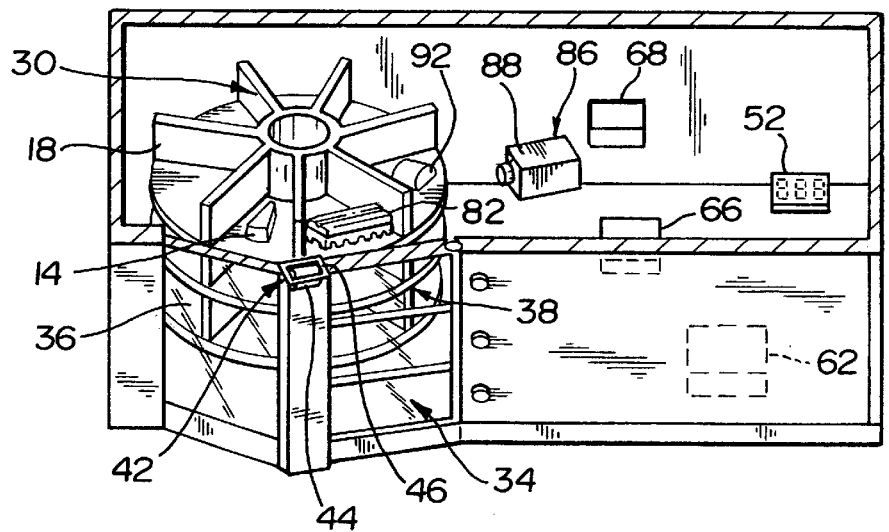
FIG. 2 is a partial cross sectional perspective view of the vending machine of FIG. 1, as viewed from the front and above.
Figure 3:
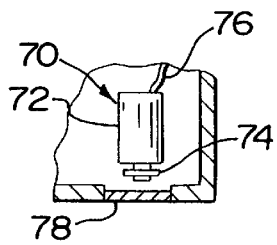
FIG. 3 is a partial sectional view of the preferred embodiment of FIG. 1, taken along line 3—3.

FIGS. 1–3 illustrate a first preferred embodiment of the invention that includes a refrigerated vending machine 10 which can be used for properly dispensing cooked and/or uncooked food products 14, such as meat, cheese, sandwiches, and the like.

The vending machine 10 may be refrigerated and have at least one food compartment 18 configured to hold pre-weighed and/or pre-priced food products 14.

Optional advertising indicia and decorations such as the illustrated apple and "EAT FRESH FOOD" logo 20 may be provided to attract customers, and to emphasize that fresh food products are being sold.

When a user wants an item stored/displayed in a particular food compartment 18, the user pays the proper amount by determining the price of item, and then inserting at least the corresponding dollar amount in coin slot 22 and/or a bill slot/dollar bill reader 26.

If more than the required amount is inserted, change may be given in a change return 28.

After proper payment is received, the associated dispensing mechanism, such as an illustrated so-called lazy susan or carrousel or other dispensing mechanism 30 having a plurality of food compartments 18, rotates to the proper position in front of an associated door 34, and the door 34 is unlocked thus releasing the food item to the user.

Door 34 with a glass food viewing window 38 may be provided.

A further viewing window 36 may be provided for looking at food product 14 in the position immediately preceding the dispensing position.

A lock-out element or mechanism 42 using a conventional electrical solenoid 44 and a corresponding retractable locking pin 46 inserted into corresponding hole in door 34 prevents opening of the door 34 (and, hence, prevents accessing the food item) without payment of the required amount. Payment may be made by coins/bills, as is known and discussed above, authorization by a credit card reader (which may be a part of the vending machine), and the like.

When correct payment is received, solenoid 44 retracts locking pin 46, and door 34 is unlocked for access by the user. Alternatively the food item may be dropped into an unillustrated chute accessible by the user.

Various sensors for preventing sale of potentially imperfect/spoiled food items are expected to provide the final "say" (i.e., electronic/electromechanical/electrical determination) as to whether food 14 may be dispensed to a user.

For example, a "too warm" condition sensed in a meat-dispensing compartment of the food compartments 18 blocks sale of the meat even when the correct payment has been received by the vending machine 10. That "too warm" condition may be determined by a conventional temperature sensor adjacent the associated meat compartment and/or by a temperature sensor which determines an overall internal vending machine 10 temperature. Such temperature sensor may feed a signal to a temperature display/temperature history recorder 52.

The temperature display/temperature history recorder 52 may include an alarm for detecting/signaling a warming situation, a temperature malfunction recorder, and temperature malfunction lock-out or lock-out element to prevent use if the products/product environment is/has been too warm (or too cold), is on an increasingly warm "path" based on measured temperatures and, hence, is on its way to becoming too warm based on temperature data analysis; i.e., a "warming situation". A remote alarm/call system may be activated if one or more of such unacceptable temperature conditions occurs. A "warming situation" is a condition of increasing temperatures sensed by temperature sensor and processed/recorded by temperature history recorder 52. If the owner of the machine is alerted early enough to a "warming situation" the owner may be able to fix the underlying problem before spoilage of food items 14 occurs.

In addition, the refrigerated vending machine 10 may be configured to meet the sanitary codes for food products 14 such as meats and cheeses; e.g., the device may be washable/waterproof both inside and out.

It is likewise contemplated that the one or both of temperature display/temperature history recorder 52 and vending machine 10 includes a precise temperature control, which may include a temperature sensor, to ensure that the food products 14 are kept neither too cold nor too warm. For example, for many meat products it is desirable to hold the meat at a specific temperature and within a range of e.g., +/− two degrees Fahrenheit (2° F.).

Still further, the refrigerated vending machine 10 may accept debit cards and vendor tokens (such as chain store tokens) in addition to cash, credit cards, charge cards, and the like.

The vending machine 10 thus is capable of vending pre-cooked and uncooked food products in a more consistent and regulated manner than possible with known devices.

The vending machine 10 may include large food compartments 56 and controls which dispense oversized food products, such as full cuts of meat, roasted/broiled half or full chickens/other poultry, bags of fruit, or containers of milk, which are likewise held in a controlled environment.

It is likewise contemplated vending machine 10 may include a master malfunction recorder and data processor 62 that dispenses a data readout which may be on or off site. Master malfunction recorder and data processor 62 may collect, assess, and act on all collected vending machine 10 data.

The master data processor 62 may control lock-out mechanism 42 for preventing dispensing of food items when certain conditions have been detected by one or more sensors disposed in or adjacent to the vending machine 10.

Vending machine 10 likewise may include controls, and compartments for containing products to be dispensed that meets sanitary codes for meat, poultry, seafood and/or cheese, for example, and which device can be "washed down" externally and/or internally thanks to the surfaces of the inside of the compartments and the exterior surfaces.

It is further contemplated that a calling device 66 be provided on the food vending machine 10 which is governed by master data processor 62 and which is capable of sending out a distress call to a central station/operator when certain conditions have been met; e.g., when a temperature malfunction has been detected by temperature history recorder 52 and/or theft/burglary/vandalism on the device has occurred, as described below.

A motion detector 68 may also be provided.

Typically, motion detector will be set to detect the types of movements to vending machine 10 that are associated with vandalism, theft, or rocking of vending machine 10. A sensor within motion detector 68 may be set to sound an internal, a local, or an off-site alarm when vending machine 10 has been tilted more than a predetermined number of degrees from its normal upright position; e.g., such as when a user or vandal attempts to rock or tilt vending machine 10 to obtain a free product or to harm the machine.

By detection of such movement, motion detector 68 also functions as a machine theft detector; i.e., detector 68 can determine when unauthorized movement has occurred, which movement is consistent with theft of the machine itself, not just theft of its contents.

An audio or visual monitor (e.g., television camera 70) may be connected to the food vending device 10.

Such monitor may be configured so as to be connectable to an instore monitor. For example, camera 70 may be a conventional video camera having a body 72, a focussing lens 74, and a data signal feed line 76 for connection to a remote signal processing device which records the visual data gathered by camera 70. Lens 74 and body 72 may be located appropriately behind so-called "one-way" glass or plastic 78 with reflective coatings thereon so that camera 70 is not readily visible to users of the vending machine 10.

The vending device is expected to be configurable (owing to a combination of temperature control devices, and food vending compartment configurations), so as to be suited for dispensing specialized products, such as three (3) eggs or six (6) eggs in an egg carton 82 and/or pre-weighed, uncooked meat.

Additionally, the vending machine 10 may be equipped with a date code sensitive system 86 and each individual compartment 18 may be assigned a specific identification location. Thus, as a food product 14 is loaded into each compartment 18, a bar code reader may read the expiration date and assign the same to that compartment. This would allow the service person or a remote site to read the date and take corrective action when the date was nearing expiration.

Date code sensitive system 86 may include an illustrated bar code scanner 88 which is situated to actively read the bar code on a particular item, such as an illustrated loaf of bread 92. In that manner, one has the assurance that a given food item 14 is in a given food compartment 18. Thus, the operator eliminates the possibility that a scanned food item 14 has not been placed in an assigned food compartment 18.

As illustrated in FIG. 2, the food product 18 (i.e., loaf of bread 92) the bar code of which is being scanned by bar code reader 88 is not the item 14 which is next to be dispensed. The master data processor 62 keeps track of the positions of all food items 14. Thus, even though bread 92 is six (6) positions before the dispensing position behind door 34, its relative position is known. Accordingly, if bread 92 is expired, master data processor blocks sale thereof when bread 92 is advanced six (6) positions.

It is contemplated that scanner 88 may be moved to the position immediately prior to the dispensing position on lazy susan 30; i.e., to the position directly behind viewing window 36 in the case where lazy susan 30 rotates counter-clockwise as viewed in FIG. 2.

Or, scanner 82 may be located to scan the bar code information on the food item 14 (e.g. illustrated egg carton 88) located directly behind door 34.

The system may thus be configured so that the bar code date, when expired, triggers a lock out element for that item 14 compartment, thus preventing the vending of potentially unhealthy food items 14.

Optionally, a sign or display 94 may illuminate so that the consumer is aware of why visible food stuffs in a compartment are not for sale. In FIG. 1 sign 94 reads "ITEM PAST EXP. DATE"; namely, the eggs in egg carton 82 are "past [their] expiration date" and may not be dispensed based on the bar code information read by scanner 88 when egg carton 82 was in the position now occupied by loaf of bread 92.

It is also contemplated that a single bar code reader be programmed to store location data and food product data so that as a service person loads the machine, each location and each food product (with bar coded date) is stored in memory. In this fashion, each vending machine would have a date coded inventory stored in memory for use in managing inventory as it relates to expiration dates.

Such inventory information may be stored in vending machine 10 or transmitted off site by master data processor 62 and remote transmitter 68. In that manner, a central computer is provided with continuing updated inventory information for each vending machine in a series of vending machines. Thus, an off-site inventory control system is achieved for one or more vending machines.

Likewise, it is also possible to engineer vending machine 10 itself so that it is outfitted with an inventory control system which ties locations and bar code dated food stuffs together through the use of a bar code system.

Figure 4:
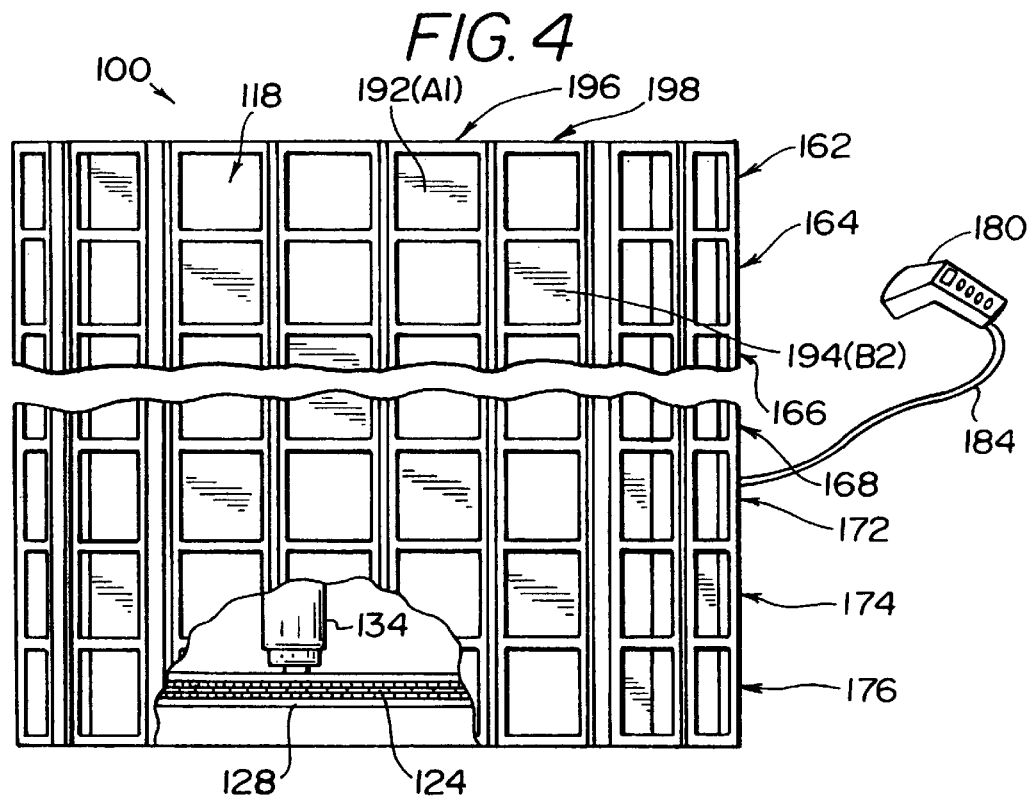
FIG. 4 is a front elevational view of a further preferred embodiment of a vending machine according to the invention.
Figure 5:
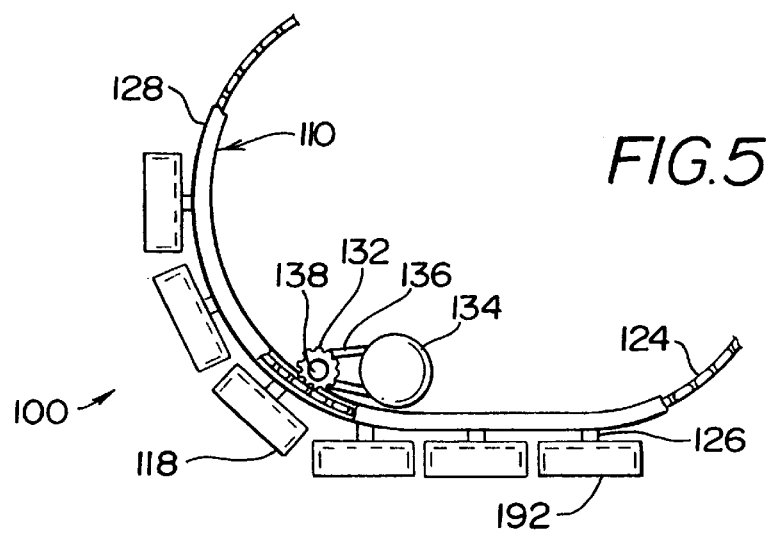
FIG. 5 is a partial, top plan view of the vending machine of FIG. 4.

FIGS. 4 and 5 illustrate a further preferred embodiment of a vending machine or dispensing device 100 according to the invention.

Vending machine 100 includes a dispensing mechanism 110 having a plurality of food or product compartments 118. Product compartments 118 may be connected to a driven element, such as a chain or other flexible strand 124 by means of links 126. Links 126 may be movably connected to one or both of compartments 118 and chain 124. Chain 124 may move along within a housing 128.

Housing 128 may be at least partially open so that a drive gear 132 meshes with and drives chain 124 for movement of chain 124 along its path of travel. Conveniently, a motor 134 is provided that powers gear 132 by use of a pulley or drive chain 136 which drives a shaft 138, and which shaft 138 carries gear 132.

Successive ones of dispensing compartments 118 are moved, in turn, into position behind an access door (as in the FIG. 1 embodiment) for being accessed by the consumer when the proper money has been deposited in vending machine 100 or vending machine 100 has otherwise been properly activated for dispensing of a product contained in one of compartments 118. Motor 134 is activated for moving chain 124 and, hence, compartments 118 into proper position behind the respective access doors, as described above.

As in the other preferred embodiments, the sizes and configurations of compartments 118 may be varied for dispensing different products.

Likewise, one or more of the various monitoring devices described above in connection with the preferred embodiment of FIGS. 1-3 may be used for monitoring and controlling vending machine 100. Still further, the controls as described above and below may likewise be used.

In the FIGS. 4 and 5 embodiment there may be a total of one hundred twelve (112) compartments 118; i.e., a total of sixteen compartments 118 on each one of seven different levels or rows 162, 164, 166, 168, 172, 174, and 176. Each one of levels 162–176 may have a corresponding drive gear 132 for powering a respective chain 124, for example, to ensure smooth movement for a plurality of chains. Alternatively, a number of driven gears 132 may be provided at the illustrated uppermost level 162 and the lowermost level 176 with the various levels 162–176 all joined for movement together; i.e., for synchronous movement.

It is likewise expected that a single bar code scanner 180 be provided for entering data into the master control or computer on vending machine 100.

Likewise, it may be preferable to have scanner 180, such as a hand-held bar code or expiration date scanner, detachably attached to a data processor on vending machine 100 so that after the data has been entered the detachable lead 184 of scanner 180 may be disconnected. By disconnecting lead 184, the service person may then connect lead 184 to a central computer on the service van or download the information by connecting lead 184 to a central computer when the service person returns to his or her home office at the end of the service run or at the end of the work day.

In that manner, vending machine 100 "knows" that it has been loaded and the central office computer likewise knows that that particular vending machine 100 has been loaded with a particular item in each one of slots or compartments 118.

Figure 6:
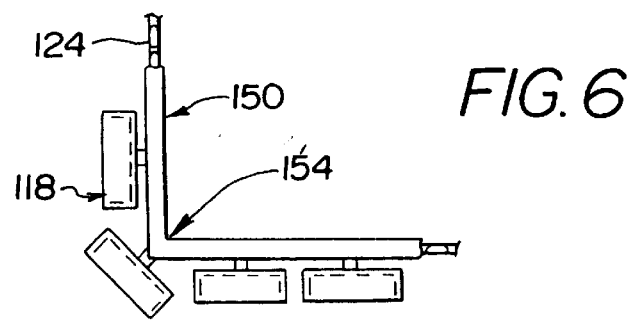
FIG. 6 is a further preferred embodiment of the invention showing another path of travel of product dispensing compartments according to the invention.

FIG. 6 illustrates another preferred embodiment of the invention in which chain 124 travels a path which includes at least one relatively abrupt change of curvature, such as the illustrated corner 158 in the path of chain 154. Corner 154 is used for vending machines and situations where the shape of the vending machine, or the shape of the path of chain 150, are useful for the intended purpose or to accommodate components with which the vending machine is to be built.

Typically, for convenience in interpreting the data, each individual compartment 118 will be given its own identifier. For example, top row 162 may be identified as row A, the next row down 164 may be identified as row B, and so forth. Then, in each row, each compartment 118 will be identified as one of a number 1–16. In other words, each of the sixteen columns can be assigned a particular identifier. For example, an illustrated column 196 is column 1, a column 198 is column 2, and so forth. Thus, a specific compartment 192 which is in row 162 (i.e., row A) and which is likewise located in column 196 (i.e., column 1) is designated as specific compartment A1 in FIG. 4. A further specific compartment 194 is identified as compartment B2 as it is in column B (i.e., row 164) and in column 2 (i.e., column 198).

Vending machine 100, as well as the other vending machines, will typically be made so that only one access door may be opened at a time when the service person is loading the product to be dispensed into vending machine 100. In that manner, the data processor/computer associated with vending machine 100 knows that the product which has been scanned by scanner 180 is placed within compartment 192 (i.e., compartment A1) when that compartment 192 is behind its associated access door and its access door is in the position at which may be opened.

Preferably, when vending machine 100 is dispensing product only one access door can be opened, and vending machine 100 subtracts that product from its inventory, whether or not the customer has actually removed the product when the product has been behind an unlocked access door.

In that manner, the accessed one of compartment 118 may never be accessed again until a service person has serviced the machine, whether or not the unlocked door to the particular accessible compartment 118 was ever accessed (i.e., opened), or was opened and not emptied, or was opened and refilled with an unauthorized object. In that manner, product tampering is prevented. Likewise, the owner of vending machine 100 is provided with inventory control, the quantity of items for every vending machine 100 in the system is known on an ongoing basis, and a "perpetual inventory control" or "live" inventory is maintained. Still further, that provision of a continual stream of inventory data regarding which ones of compartments 118 are filled with which products yields an expired/lost item report. That expired item report is provided thanks to the expiration date data having been scanned into the system so that the system knows to lock out a particular access door when an expired item is in the compartment 118 in the access position behind the access door as the system knows that the item has expired. Thus, expired items are prevented from being dispensed.

Since the status of each compartment is known, and each compartment has a date code assigned to the item in that compartment, then each sale of an item, whether or not vended, leaves a perpetual inventory with expiration dates per item of items that have been isolated from any potential tampering, and a separate inventory of unvendable items which have been exposed to potential tampering.

Since the perpetual inventory is maintained accurately by the control device, then at such time as the service person replenishes the compartments 118 then items which may still be present in compartment 118 that have been sold and are thus considered unvendable can be accounted for by and the service personnel using the scanner and disposed of properly. In other words, the computer will tell the service person which compartments 118 should be empty. Thus, if such "empty" compartments have products therein, the service person knows to empty the compartments.

The computer may likewise alert service personnel to a soon-to-expire item in a particular compartment.

Another benefit of having the service person plug in hand-held bar code/expiration date scanner 180 into the data port on vending machine 100 is that greater assurance is provided that the particular vending machine was actually loaded with inventory. Hence, product loss and theft is reduced.

A camera or other means for determining whether product is actually present in the compartment 118 may be provided as in the other embodiments.

It is likewise contemplated that a single camera may be used to provide data on each compartment. Such is accomplished by using an optical fiber which goes from the camera to the desired position in the vicinity of the observed compartment 118 back to the image transmission device such as a camera. Alternately, mirrored pathways may be provided for transmitting visual data from each of the illustrated seven levels or rows in the embodiment of FIGS. 4 and 5.

It is expected that an adjustable timing mechanism may be added to the vending machine so that after a controlled period of time the accessed door may no longer be opened.

All the variations set forth herein may be used in each of the embodiments described.

It is contemplated that any and all illustrated sensors, alarms, data processing and storage devices be combined as one or more combination devices.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What is claimed is:

1. A device comprising:
   a) a vending machine;
   b) at least one food compartment provided in said vending machine for dispensing a food product;
   c) a temperature sensor located for sensing a condition inside said at least one food compartment; and
   d) a lock-out element associated with said temperature sensor and with said at least one food compartment for regulating access to said vending compartment.

2. A device as defined in claim 1, wherein:
   a) said lock-out element prevents operation of said at least one food compartment when a temperature detected by said temperature sensor exceeds a predetermined temperature.

3. A device as defined in claim 1, wherein:
   a) said lock-out element prevents operation of said at least one food compartment when said temperature sensor detects a temperature which has exceeded a predetermined temperature for a predetermined period of time.

4. A device as defined in claim 1, wherein:
   a) a remote calling device is associated with said temperature sensor for contacting a further device when said sensor detects a predetermined condition.

5. A device as defined in claim 1, wherein:
   a) a temperature recorder is associated with said at least one food compartment.

6. A device as defined in claim 1, wherein:
   a) said at least one food compartment is configured for being washed at least one of internally and externally.

7. A device as defined in claim 1, wherein:
   a) at least one of a cash, credit card, charge card, debit card and vendor token receiving device is associated with said vending machine.

8. A device as defined in claim 1, wherein:
   a) a remote calling device is operatively associated with said vending machine, said remote calling device being capable of sending out a call to a remote station when a theft of said vending machine has occurred, a burgling of said vending machine has occurred, and an act of vandalism on said vending machine has occurred.

9. A device as defined in claim 1, wherein:
   a) a monitor is associated with said vending machine, and said monitor includes one of an audio, a motion-sensitive, or a visual monitor.

10. A device as defined in claim 1, wherein:
    a) a date reader is associated with said vending machine.

11. A device as defined in claim 10, wherein:
    a) said date reader includes a date code sensitive system including a bar code reader configured for reading a bar code on an item disposed in said at least one food compartment.

12. A device as defined in claim 11, wherein:
    a) said bar code reader includes a trigger for locking said at least one food compartment for preventing access to said at least food compartment when a date corresponding to a bar code on a food item in said at least one food compartment exceeds a predetermined expiration date.

13. A device as defined in claim 1, wherein:
    a) a display is associated with said at least one food compartment and with said lock-out element for indicating to a user why said lock-out element was activated for preventing access to a food item in said at least one food compartment.

14. A device as defined in claim 1, wherein:
    a) a bar code reader is associated with said vending machine;
    b) at least one of store location data and food product data is stored in a memory;
    c) said memory stores the store location and food product data for use in managing inventory of items located in said at least one food compartment.

15. A device as defined in claim 1, wherein:
    a) a computer is associated with said at least one food compartment;
    b) said computer tracks whether or not said lock-out element has provided access to said at least one food compartment to provide compartment access data; and
    c) said computer compares the compartment access data and the expiration date of the food product so that a continually updated live inventory is provided, the live inventory including non-accessed products which have expired and which accessed products form a part of a dead inventory.

16. A device as defined in claim 1, wherein:
    a) a timing mechanism is provided so that after a predetermined period of time the food compartment may no longer be accessed.

17. A device as defined in claim 10, wherein:
    a) said date reader is detachably attached to said vending machine.

18. A device comprising:
    a) a vending machine;
    b) a vending compartment provided in said vending machine for dispensing a food product;
    c) a temperature sensor located for sensing a temperature inside said vending compartment;
    d) a lock-out element associated with said sensor and with said vending compartment for regulating access to said vending compartment; and e) said lock-out element preventing operation of said vending compartment when said temperature sensor detects a temperature which has exceeded a predetermined temperature for greater than a predetermined period of time.

19. A device as defined in claim 18, wherein:

a) a remote calling device is associated with said temperature sensor for contacting a further device when said sensor detects a predetermined condition.

20. A device as defined in claim 18, wherein:

a) a door is provided for accessing the vending compartment; and b) the lock-out element prevents opening of the door when the temperature sensor detects the predetermined temperature for greater than the predetermined period of time.

21. A device as defined in claim 18, wherein:

a) a temperature history recorder is operatively associated with said temperature sensor, said temperature history recorder storing past and present temperature data; and b) said lock-out element prevents access to said vending compartment when said temperature sensor detects a temperature which has exceeded a predetermined temperature for greater than a predetermined period of time in the past.

22. A device as defined in claim 18, wherein:

a) the vending compartment includes various sizes of food compartments.

23. A device comprising:

a) a vending machine;

b) a vending compartment provided in said vending machine for dispensing a food product;

c) a sensor located for sensing a condition inside said vending compartment;

d) a lock-out element associated with said sensor and with said vending compartment for regulating access to said vending compartment; and e) a food condition display is associated with said vending compartment and with said lock-out element for indicating to a user why said lock-out element was activated for preventing access to a food item in said at least one vending compartment.

24. A device as defined in claim 23, wherein:

a) said lock-out element prevents operation of said vending compartment when said temperature sensor detects a temperature which has exceeded a predetermined temperature for a predetermined period of time.

25. A device comprising:

a) a vending machine;

b) a vending compartment provided in said vending machine for dispensing a food product;

c) a date reader system associated with said vending compartment; and d) said date reader system being disposed for actively reading a date on an item when the item is present inside the vending compartment for assuring that the item present in the vending compartment corresponds to an item from which the date was read by the date reader system.

26. A device as defined in claim 25, wherein:

a) said date reader system includes a bar code reader.

27. A device as defined in claim 25, wherein:

a) a lock-out element is associated with said vending compartment and with said date reader system for regulating access to said vending compartment when said date reader system determines an item in the vending compartment has exceeded a predetermined expiration date.

28. A device as defined in claim 25, wherein:

a) said vending machine includes a refrigerated vending machine.

29. A device as defined in claim 25, wherein:

a) said date reader system actively reads a date on an item present in said vending compartment only when the item is present in said vending compartment.

30. A device comprising:

a) a vending machine;

b) a vending compartment provided in said vending machine for dispensing a food product;

c) a temperature sensor located for sensing a condition inside said vending compartment; and d) an alarm operatively associated with said temperature sensor, said alarm signaling an unacceptable temperature condition when said temperature sensor has sensed a condition of increasing temperatures outside a predetermined range of acceptable increasing temperatures.

31. A device as defined in claim 30, wherein:

a) said alarm includes a remote calling device, and said remote calling device contacts a further device when said alarm is actuated.

32. A device as defined in claim 30, wherein:

a) a lock-out element is associated with said temperature sensor and with said vending compartment for regulating access to said vending compartment.

33. A device comprising:

a) a vending machine;

b) a vending compartment provided in said vending machine for dispensing a food product;

c) a sensor located for sensing a condition inside said vending compartment; d) a lock-out element associated with said sensor and with said vending compartment for regulating access to said vending compartment; and e) said lock-out element preventing future access to said vending compartment when said lock-out element has allowed access to said vending compartment and a user has accessed the said vending compartment, whether or not the user has removed a food product from the said vending compartment to which the lock-out element had allowed access.

34. A device as defined in claim 33, wherein:

a) a computer is operatively associated with said lockout element and said vending compartment;

b) said computer tracks an inventory of items placed in said vending compartment; and c) said computer subtracts a food product from inventory when, in use, said lock-out element has allowed access to said vending compartment, whether or not a user has removed such food product from said at least one food compartment to which access had been allowed.

35. A device comprising:

a) a vending machine;

b) a product compartment provided in said vending machine for dispensing a perishable product;

c) a computer operatively associated with said vending machine for tracking the temperature history of the perishable product;

d) a lock-out element associated with said computer and with said product compartment for regulating access to said product compartment; and e) said lock-out element preventing operation of said product compartment when said computer determines the perishable product has experienced a temperature history outside a predetermined temperature history.

36. A device as defined in claim 35, wherein:

a) said lock-out element prevents operation of said product compartment when said computer determines the perishable product has experienced a temperature greater than a predetermined temperature range for greater than a predetermined period of time.

37. A device as defined in claim 35, wherein:

a) said computer is provided on said vending machine;

b) a data port is operatively connected to said computer and is connectable to a hand-held scanner data lead; and c) said scanner includes a hand-held scanner having a data lead connectable to said data port on said vending machine.

38. A device as defined in claim 37, wherein:

a) said computer tracks whether or not said lock-out element has provided access to said product compartment to provide compartment access data; and b) said computer compares the compartment access data and the expiration date of the perishable product so that a continually updated live inventory is provided, the live inventory including non-accessed products which have expired and which accessed products form a part of a dead inventory.

\* \* \* \* \*